Feb. 8, 1955 W. T. GRAHAM 2,701,511
CLAMP SUPPORT FOR PLOW SHANKS
Filed June 29, 1950 5 Sheets-Sheet 4
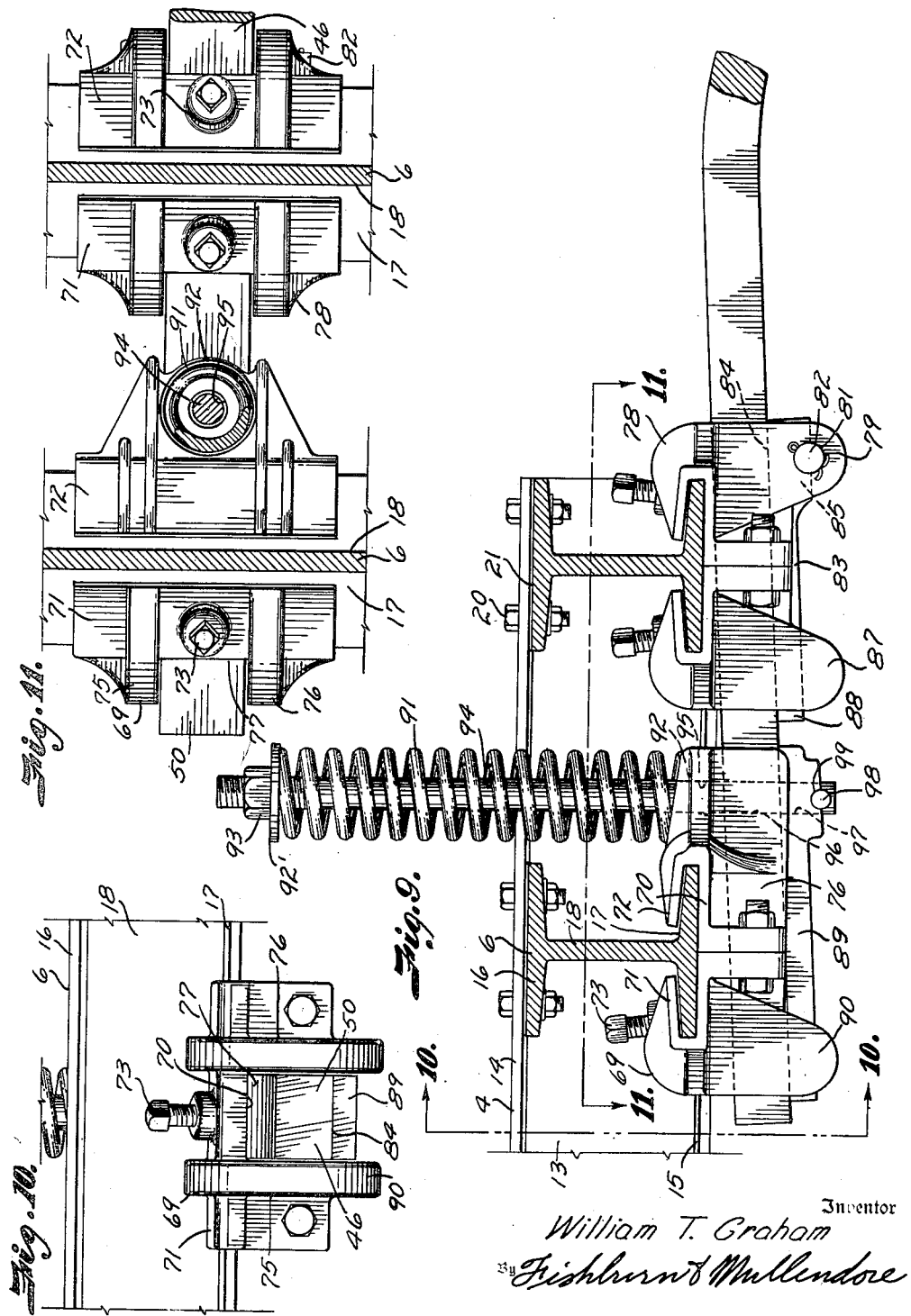
Inventor
William T. Graham
By Fishburn & Mullendore
Attorneys

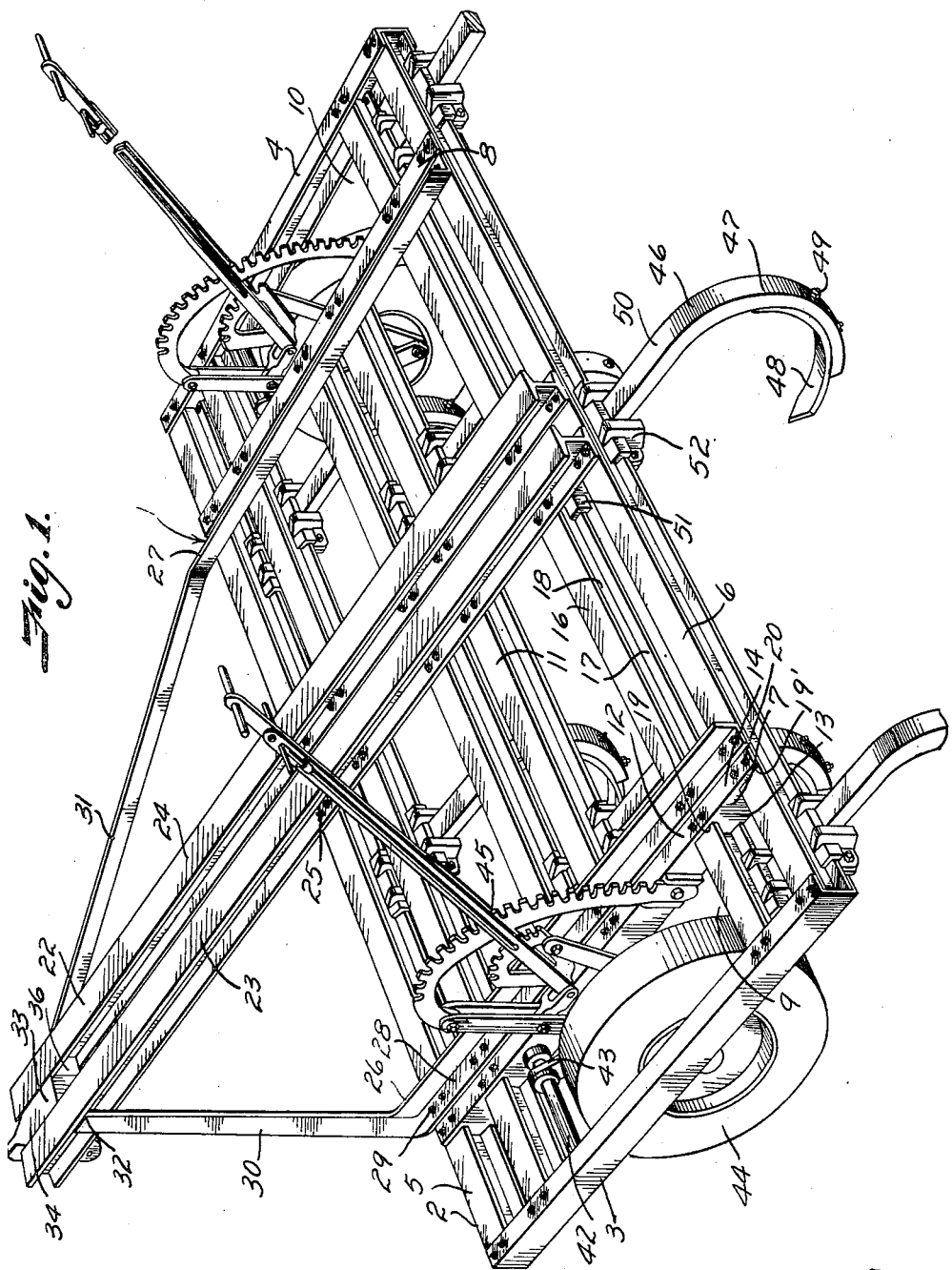

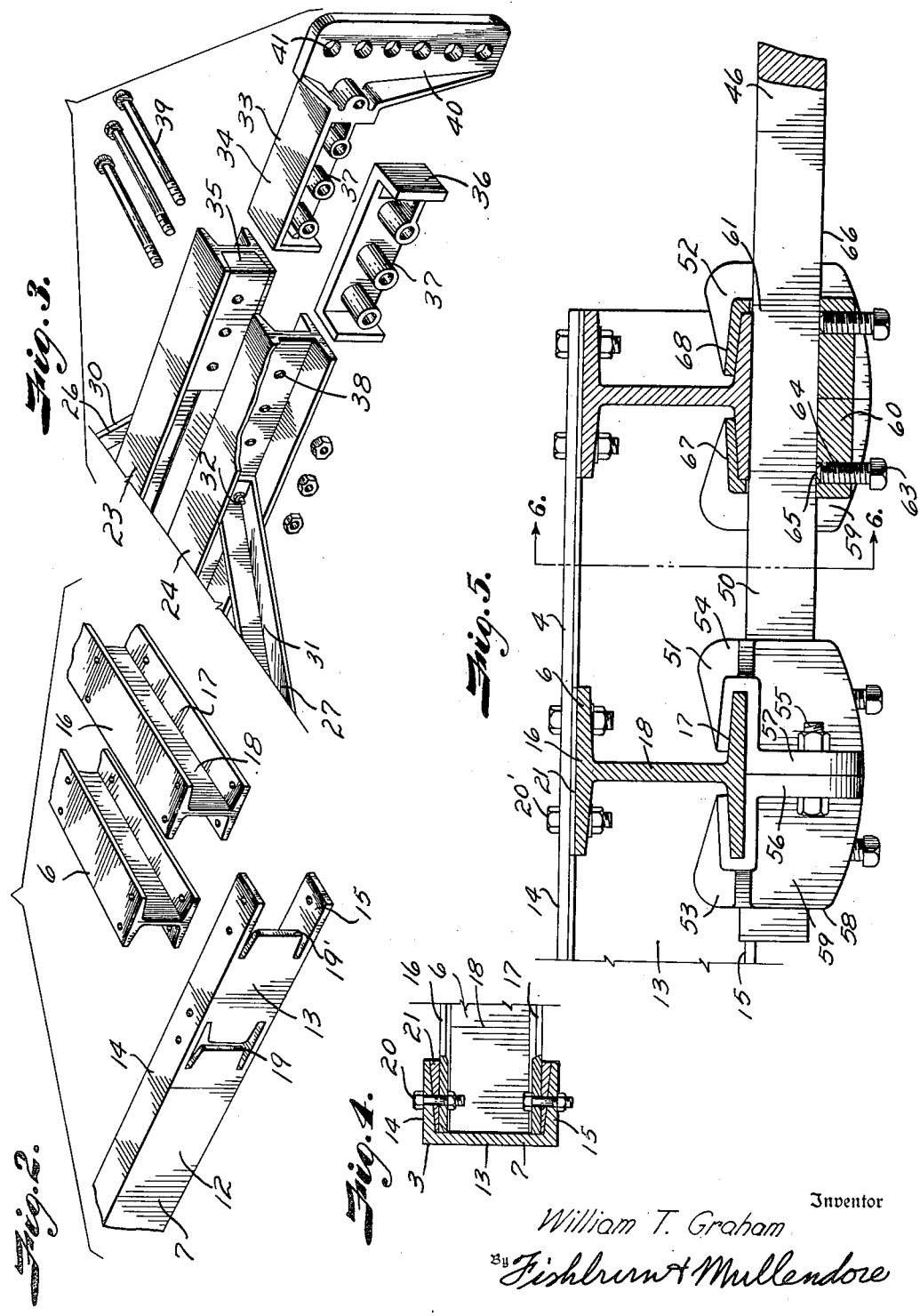

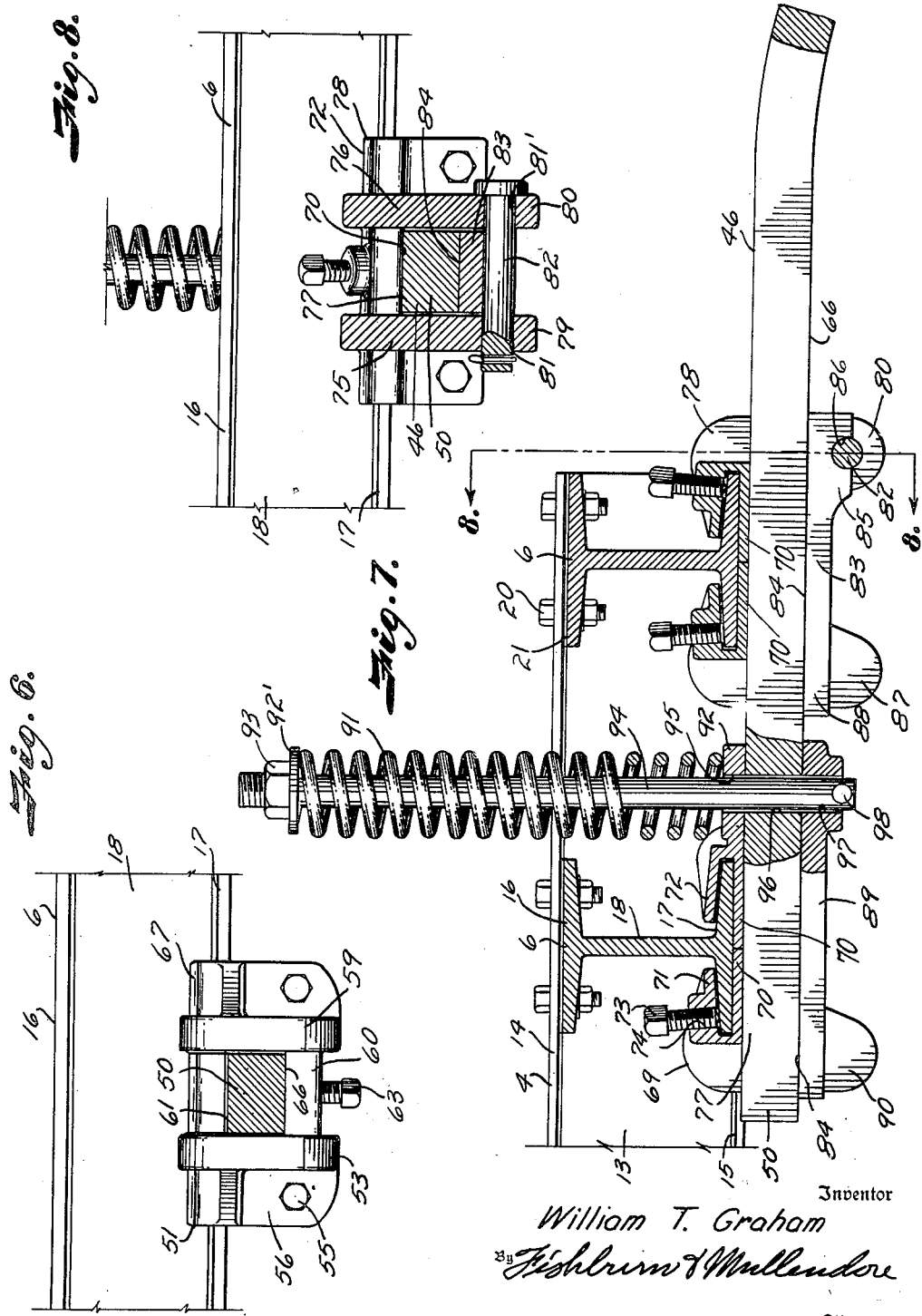

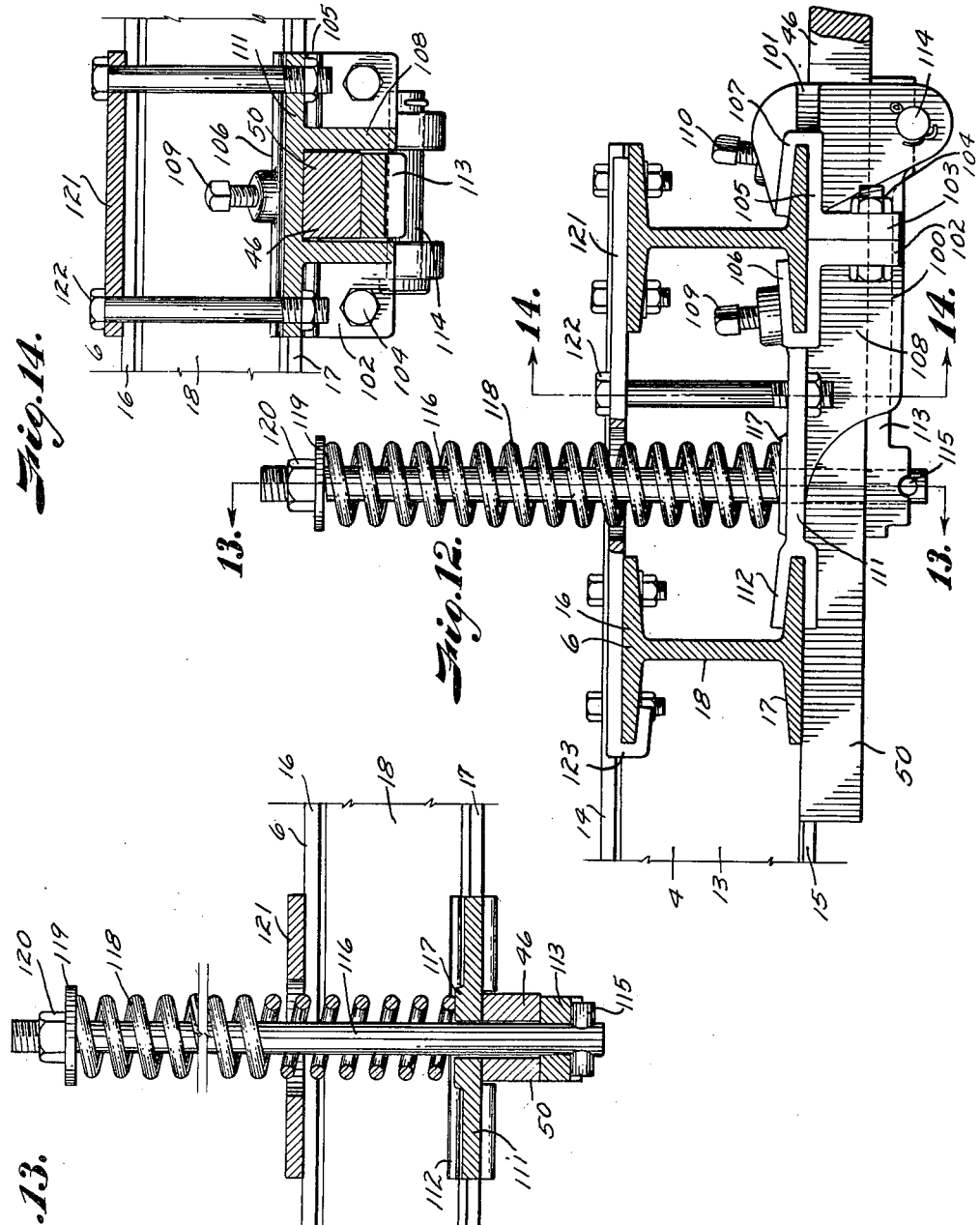

United States Patent Office 2,701,511
Patented Feb. 8, 1955

2,701,511

CLAMP SUPPORT FOR PLOW SHANKS

William T. Graham, Amarillo, Tex., assignor to The First National Bank of Amarillo, Amarillo, Tex., a corporation Application June 29, 1950, Serial No. 171,095

4 Claims. (Cl. 97—198.1)

This invention relates to plows of a type including a plurality of laterally spaced ground conditioning tools that work under the surface to heave and break the soil and form a plurality of alternating ridges and furrows having exposed surfaces composed of clods, straw, and other natural mulching material normally occurring on a field.

In plows of this character, all forces developed by engagement of the ground working tools are transmitted through the tool shanks to the plow frame and it has heretofore been difficult to make the frames sufficiently rigid and to provide satisfactory attachments of the shanks to the frame. The difficulty has been aggravated by the fact that shanks must have a certain amount of resiliency and the total weight of the plow must be kept within practical limits. Also when the plows are turned down, thrusts are developed on the shanks that are on the side of the plow in the direction of the turn which forces tend to twist the frame members in the opposite direction.

It is therefore the principal object of the present invention to provide such plows with a frame and shank mounting wherein all forces developed by engagement of the ground working tools are better distributed so as to avoid concentration of the forces on any one member of the frame.

Other objects of the invention are to provide a frame which includes pairs of shank attaching members arranged so that the forces are distributed to both members and one member resists distortion of the other member; to provide a more efficient clamping mechanism for the tool shanks; to provide a shank mounting means wherein the shank is adapted to pivot on one clamp and be resiliently connected with another clamp; to provide a frame structure wherein the transverse members have a simple and more secure connection with the longitudinal members; to provide a tongue structure for the plow frame which comprises a pair of members extending longitudinally across the transverse members of the frame to cooperate with other longitudinal members of the frame in maintaining rigidity and prevent distortion of the transverse members of the frame.

In accomplishing these and other objects of the invention hereinafter pointed out, I have provided improved structure the preferred form of which is illustrated in the accompanying drawings, wherein:

Fig. 1 is a perspective view of a plow constructed in accordance with the present invention.

Fig. 2 is a perspective view of portions of a pair of transverse frame members and a longitudinal member shown in disassembled spaced relation.

Fig. 3 is a fragmentary perspective view of the forward end of the tongue and showing the hitch members in disassembled spaced relation.

Fig. 4 is a cross section through a portion of the frame, particularly illustrating the filler pads between the longitudinal and transverse members to compensate for the angularity of the inner faces of the flange portions of the frame members.

Fig. 5 is an enlarged cross section through a pair of transverse frame members particularly illustrating one form of clamp for connecting the tool shanks, one of the clamps being shown in elevation and the other in longitudinal section to better illustrate anchoring of the tool shanks.

Fig. 6 is a sectional view on a line 6—6 of Fig. 5, showing one of the clamps in end elevation.

Fig. 7 is a longitudinal section through a modified form of shank mounting wherein the shank has rocking movement on one of the clamps and is resiliently retained by the other clamp.

Fig. 8 is a section on a line 8—8 of Fig. 7.

Fig. 9 is a section similar to Fig. 7 but showing the tool shank in rocking relation relatively to the plow frame.

Fig. 10 is a cross section on a line 10—10 of Fig. 9.

Fig. 11 is a horizontal section on a line 11—11 of Fig. 9.

Fig. 12 is a longitudinal section showing a further modified form of the invention.

Fig. 13 is a section on a line 13—13 of Fig. 12.

Fig. 14 is a cross section on a line 14—14 of Fig. 12.

Referring more in detail to the drawings:

1 designates a plow constructed in accordance with the present invention and which includes a frame 2 composed of side or longitudinal members 3 and 4 which connect front and rear pairs of transverse beams 5 and 6. The frame also includes longitudinal members 7 and 8 that are spaced inwardly from the side members 3 and 4 to provide wheel pockets 9 and 10. The frame further includes a pair of transverse members 11 connected with the longitudinal members 7 and 8 at a point intermediate the pairs of transverse members 5 and 6 as shown in Fig. 1. The longitudinal members 3, 7, 8, and 4 preferably comprise channel members 12 having webs 13 arranged vertically and their flanges 14 and 15 horizontally to overlap the upper and lower face portions of the transverse members. The transverse members are shown as comprising I beams having upper and lower horizontal flanges 16 and 17 connected by vertical webs 18. The webs of the longitudinal members 7 and 8 are provided with substantially I shaped openings 19 and the ends thereof are similarly slotted as at 19' to pass the front and rear pairs of transverse members therethrough as shown in Fig. 1. The upper and lower flanges 14 and 15 of the longitudinal members 3, 7, 8, and 4 overlap the upper and lower flanges of the transverse members and are secured thereto by fastening devices such as bolts 20 that extend through the overlapping portions of the flanges and through filler strips 21 that are inserted between the flanges to compensate for the angularity of the inner faces of the upper and lower flanges of the channels as shown in Fig. 4. The parts may therefore be drawn into rigid contact so as to provide a frame of strong and rigid construction which is firmly braced against rocking and wherein forces acting on the frame members are distributed through the frame structure.

The frame also includes a tongue 22 composed of a pair of longitudinal members 23 and 24, the members 23 and 24 being spaced apart as shown in Fig. 1. The members 23 and 24 also comprise I beams arranged with the webs extending vertically and the upper and lower flanges horizontally with the lower flanges crossing the upper flanges of the transverse I beams to be secured thereto by fastening devices such as bolts 25.

The tongue extends forwardly of the frame and is braced by angle shaped longitudinal members 26 and 27 that extend along the longitudinal members 7 and 8 and which have horizontal flanges 28 attached to the upper flanges of the transverse members by fastening device 29. The forward ends 30 and 31 converge toward the forward end of the tongue and are suitably connected therewith as indicated at 32. Mounted between the forward ends of the tongue members is a draft connection 33 having a shank portion 34 adapted to fit snugly between filler blocks 35 and 36 that are inserted between the upper and lower flanges and webs of the tongue members as shown in Fig. 3.

The fillers 35 and 36 and shank 34 are provided with tubular bosses 37 which register with openings 38 in the webs of the tongue members to pass fastening devices such as bolts 39. The member 33 also includes a head 40 having a series of openings 41 for attaching the draft bar of a tractor or the like by which the plow is drawn over a field.

Mounted at the forward end of each wheel pocket is a shaft 42 carrying arms 43 mounting ground wheels 44 as shown in Fig. 1. The frame is adapted to be raised and lowered with respect to the wheels by suitable levers 45 which specifically form no part of the present invention.

The ground working tools are arranged in spaced relation along the length of the pairs of transverse members with the ground working tools carried by one pair of transverse members staggered with respect to the ground working tools carried by the other pairs of transverse members as shown in Fig. 1.

The ground working tools are carried on shanks 46 having downwardly and forwardly curving portions 47 to which the tools 48 are attached by fastening devices such as bolts 49. The shanks have forwardly extending portions 50 that engage under the lower flanges of the transverse members and have bearing contact therewith. The shanks are secured by clamps 51 and 52 each composed of like sections 53 and 54 that are secured together by fastening devices 55 extending through lateral ears 56 and 57 on the respective sides of the clamps. Each clamp includes a body portion 58 having sides 59 and a bottom 60 to form a transverse passageway 61 under the lower flanges of the pairs of transverse members as shown in Fig. 5, whereby the end portions of the shanks are extended through the passageway to be secured by fastening devices such as setscrews 63. The setscrews are threaded in openings 64 formed in the bottom portion 60 and which have pointed ends 65 adapted to engage against the under face 66 of the shanks and urge the upper faces into contact with the under faces of the horizontal flanges of the longitudinal members while drawing overlying flanges 67 and 68 against the upper faces of the beam flanges as shown in Fig. 5. It is thus obvious that the shanks are supported by each of a pair of longitudinal members and that the forces developed by engagement of the ground tool by the soil are transmitted through the shank to both longitudinal members and any tendency of the shank to distort the rearmost longitudinal member is resisted by the forward longitudinal member of the pair.

In the form of the invention illustrated in Figs. 7 to 11 inclusive, the shanks of the ground working tools are adapted to rock relatively to the frame when the plow is in operation in a forward direction. The clamps are therefore provided with means for attaching the shanks of the ground working tools so as to permit such rocking movement. In this form of the invention each clamp includes a fixed part 69 having horizontal plate portions 70 engaging under the lower flanges of the I beams and having over lying flange portions 71 and 72 adapted to engage the lower flanges of the I beam as shown in Fig. 7, the clamps being secured by setscrews 73 that are threaded in internally threaded openings 74 of the flanges 71 and 72 to engage the upper faces of the I beam flanges and draw the plate portions of the clamps thereagainst. Depending from the opposite sides of the plate portions of the clamps are spaced apart longitudinal flanges 75 and 76 cooperating with the plate portions 70 to provide downwardly opening ways 77 to pass the end portions of the shanks therethrough as shown in Figs. 7, 8 and 10.

The clamp 78 on the rearmost longitudinal member of each pair of members has ears 79 and 80 depending from the longitudinal flanges 75 and 76 and which are provided with transverse openings 81 and 81' to pass a pivot pin 82 about which the shanks are adapted to pivot so as to produce a vibratory or rocking action of the ground working tools relatively to the frame of the plow. The clamps also include movable members 83 that are adapted to engage within the space formed between the longitudinal flanges 75 and 76 and which have upper faces 84 in contact with the lower faces of the shanks as shown in Fig. 7.

The movable member 83 for the rearmost clamp is provided with a thickened portion 85 having a transverse groove 86 to pass the pin 82. The movable clamping pin thus rocks about the pin 82 to permit rocking movement of the shanks when the plow is in operation. The flange portions of the rearmost clamps are also preferably provided at their forward ends with depending ears 87 that guide the forward ends 88 of the moving members 83. The movable members of the forward clamps are designated 89 and are of similar construction to the rear members 83 and have their sides guided between depending ears 90 on the forward ends of the forward clamps as shown in Fig. 7. The clamping members 88 are normally retained in contact with the inner faces of the forward ends of the shanks and the shanks in contact with the plate portions 70 of the fixed parts of the clamps by coil springs 91 having lower ends seated upon ears 92 extending from the rear ends of the forward clamps and which have their upper ends engaging a washer 92' that is backed by a nut 93 threaded on a rod 94. The rod 94 extends through the axis and slot like openings 95, 96, and 97 in the spring seat 92, shank 50, and movable plate 89 as shown in Fig. 7, the lower end of the rod being provided with a transverse pin 98 that rocks within a transverse groove 99 that is formed in the rear portion of the movable clamping member 89 similar to the groove 86 of the movable portion of the other clamp whereby the action of the spring normally retains the end portion of the shank in clamping engagement between the movable part 88 and the plate portion of the fixed part of the clamp but which is adapted to yield to allow rocking movement of the shank about the axis of the pin 82.

In the form of the invention illustrated in Figs. 12 to 14 inclusive the clamp for the rearmost transverse member includes a pair of sections 100 and 101 having laterally extending ears 102 and 103 that are connected together by bolts 104 similar to the clamp sections previously described. The sections include plate portions 105 that engage the under face of the I beam flanges and which have flanges 106 and 107 extending transversely of the body portion 108 of the clamp to overlie the upper face of the lower I beam flanges as shown in Fig. 12, the clamp being retained by fastening devices such as setscrews 109 and 110 similar to the setscrews previously described. The section 108 has an extension 111 terminating in a yoke 112 that engages the lower flange of the forward transverse member. The clamp also includes a movable member 113 that is pivotally mounted on a transverse pin 114 similar to the mounting of the member 83 in the form of the invention shown in Fig. 7; however, the movable member 113 is of longer length to pivotally connect with a cross pin 115 of a rod 116 that extends through slot-like openings in the movable member 113, the forward end 50 of the shank 46, and the extension 111 as best shown in Fig. 13.

Sleeved over the rod and bearing upon a spring seat 117 on the upper face of the extension 111 is a coil spring 118 which has its upper end seated on a washer 119 that is backed by a nut 120 on the rod so that when the shank 46 rocks relatively to the frame the movable member 113 moves downwardly therewith against action of the spring 118. When the shank 46 rocks in the opposite direction, the spring 118 returns the movable member 113 of the clamp into position to cooperate with the extension 111 in gripping the end portion therebetween and to retain the end portion of the shank in bearing contact with the under side of the foremost transverse member 6 as shown in Fig. 12.

It is thus obvious that forces applied to the rearmost transverse member of the pair is transmitted to the foremost member through the extension 111 and yoke 112. This form of clamp also includes a plate 121 that extends across the upper flanges of the I beams and which is retained in clamping relation therewith by bolts 122 that extend through the plate 121 and through the extension 111 as best shown in Figs. 12 and 14. The forward end of the plate 121 is also provided with a hook-like end 123 that engages the forward upper flange portion of the foremost transverse member as shown in Fig. 12.

From the foregoing, it is obvious that I have provided a plow of the type described with a frame that is of rigid construction and provided with pairs of shank attaching members so that the shanks may be secured to both members thereby distributing the forces acting on the shanks so as to avoid distortion in arrangement of the shank attaching portions of the frame.

It is also obvious that where a rocking shank is desired, the shanks are pivotally mounted on a movable part of one clamp member attached to one of the transverse members of the frame and resiliently retained in contact with the other clamp member attached to the forwardly disposed transverse member thereby distributing the forces to both attaching members and providing a better action for the tool shanks.

What I claim and desire to secure by Letters Patent is:

1. In a plow having a frame including spaced members extending in substantially parallel relation with each other and transversely of the direction of movement of the plow, a clamp fixed to a lower portion of the rear transverse member, a shank carrying a ground working tool and having an end portion extending transversely of lower portions of both of said transverse members, means pivotally supporting the end portion of the shank on said clamp at the rear side of said rear transverse member so that said end portion of the shank is adapted to rock downwardly from said transverse members and to stopped engagement by the transverse members, a coil spring having one end engaging the clamp at a point intermediate the transverse members for resiliently retaining the shank in stopped engagement by said members, a tie member rigidly connecting upper portions of the transverse members for transmitting torsional thrust of the shank on the rear transverse member to the forward transverse member, and means connecting the clamp with the lower portion of the forward transverse member on the side thereof nearest the spring to apply the thrust of the spring in counteraction to the thrusts on the transverse members.

2. In a plow having a frame including spaced members extending in substantially parallel relation with each other and transversely of the direction of movement of the plow, a clamp fixed to a lower portion of the rear transverse member, a shank carrying a ground working tool and having an end portion extending transversely of lower portions of both of said transverse members, means pivotally supporting the end portion of the shank on said clamp at the rear side of said rear transverse member so that said end portion of the shank is adapted to rock downwardly from said transverse members and to stopped engagement by the transverse members, a coil spring having one end engaging the clamp at a point intermediate the transverse members for resiliently retaining the shank in stopped engagement by said members, a tie member rigidly connecting upper portions of the transverse members for transmitting torsional thrust of the shank on the rear transverse member to the forward transverse member, and a yoke rigidly connected with the clamp and engaging a lower portion of the forward transverse member on the side thereof nearest the spring to apply thrust of the spring in counteraction to counteract the thrusts on the transverse members.

3. A structure as described in claim 1, and including a fastening device connecting the tie member with the clamp at a point intermediate said transverse members.

4. In a plow having a frame including spaced members extending in substantially parallel relation with each other and transversely of the direction of movement of the plow, a clamp having a part fixed to a lower portion of the rear transverse member and having a movable part hinged to the fixed part at the rear side of the rear transverse member, a shank carrying a ground working tool and having an end portion extending transversely of the lower portions of both of said transverse members and engaged between said clamp parts to rock with the movable part of the clamp downwardly from said transverse members and to return therewith in stopped engagement by the transverse members, a coil spring having one end engaging the fixed part of the clamp at a point intermediate the transverse members for resiliently retaining the shank in stopped engagement by said members, a tie member rigidly connecting the upper portions of the transverse members for transmitting torsional thrust of the shank on the rear transverse member to the forward transverse member, and means connecting the fixed part of the clamp to the lower portion of the forward transverse member on the side thereof nearest the spring to apply thrust of the spring in counteraction to the thrust on the transverse members to counteract the thrusts on the transverse members.

References Cited in the file of this patent

UNITED STATES PATENTS

| | | |
|---|---|---|
| 1,141,804 | Lamprell et al. | June 1, 1915 |
| 1,685,478 | Brenneis | Sept. 25, 1928 |
| 1,805,599 | Roberts | May 19, 1931 |
| 2,257,650 | Pfeifer et al. | Sept. 30, 1941 |
| 2,493,811 | Graham | Jan. 10, 1950 |

FOREIGN PATENTS

| | | |
|---|---|---|
| 28,844/30 | Australia | Sept. 5, 1930 |
| 576,024 | France | May 5, 1924 |
| 613,310 | Great Britain | Nov. 25, 1948 |